United States Patent [19]

Ford

[11] Patent Number: 4,679,759
[45] Date of Patent: Jul. 14, 1987

[54] ASSEMBLY FOR MOUNTING A VIBRATING BODY

[75] Inventor: David M. Ford, Northville Township, Wayne County, Mich.

[73] Assignee: Ford Motor Company, Dearborn, Mich.

[21] Appl. No.: 685,690

[22] Filed: Dec. 24, 1984

[51] Int. Cl.$^4$ ............................ F16M 7/00; F16F 5/00
[52] U.S. Cl. .................................... 248/562; 248/631; 248/636; 248/638; 267/140.1
[58] Field of Search ............... 248/562, 631, 636, 638, 248/659, 566, 632; 267/140.1, 113

[56] References Cited

U.S. PATENT DOCUMENTS

| | | |
|---|---|---|
| 1,655,204 | 1/1928 | Stevens . |
| 2,038,968 | 4/1936 | Summers . |
| 2,705,118 | 3/1955 | Beck ..................................... 248/659 |
| 3,282,542 | 11/1966 | Goodwin ............................ 248/631 |
| 3,947,007 | 3/1976 | Pelat .................................... 267/140.1 |
| 4,153,227 | 5/1979 | Gamaint .............................. 248/631 |
| 4,154,206 | 5/1979 | Le Salver ............................ 248/638 |
| 4,159,091 | 6/1979 | Le Salver et al. . |
| 4,161,304 | 7/1979 | Brenner et al. . |
| 4,352,487 | 10/1982 | Shtarkman . |
| 4,469,316 | 9/1984 | Van den Boom .................. 248/562 |
| 4,511,126 | 4/1985 | Bernuchon .......................... 248/562 |

FOREIGN PATENT DOCUMENTS

| | | | |
|---|---|---|---|
| 2712641 | 9/1978 | Fed. Rep. of Germany ... | 267/140.1 |
| 1494326 | 7/1967 | France ................................ | 248/631 |
| 123033 | 9/1980 | Japan .................................. | 248/659 |
| 144839 | 8/1984 | Japan .................................. | 267/140.1 |

*Primary Examiner*—Reinaldo P. Machado
*Assistant Examiner*—Alvin Chin-Shue
*Attorney, Agent, or Firm*—Peter D. McDermott; Roger L. May

[57] ABSTRACT

An assembly is disclosed for mounting a vibrating body to a support structure, being particularly adapted for use as an engine mount system for a motor vehicle. The assembly comprises a plurality of mounts, each of at least two of which comprises:

(A) a substantially rigid housing with a first opening and a second opening through the housing, the second opening being remote from the first opening, the housing being adapted to be rigidly attached to either the body or the support structure;

(B) a first deformable elastomeric body sealingly bonded to the housing to form a fluid-tight closure of the first opening of the housing;

(C) a second deformable elastomeric body of higher hysteretic damping value than the first elastomeric body, such second elastomeric body being sealingly bonded to the housing to form a fluid-tight closure of the second opening of the housing;

(D) means for attaching the mount to the one of the support structure and the vibrating body to which the housing is not attached, such attaching means being fixedly coupled to the first, lower damped elastomeric body, wherein the housing, the first elastomeric body and the second elastomeric body together form an expandable chamber within the engine mount adapted to receive fluid; and (E) a fluid conduit connecting the chamber of one such mount with that of at least one other such mount.

17 Claims, 3 Drawing Figures

ASSEMBLY FOR MOUNTING A VIBRATING BODY

BACKGROUND OF THE INVENTION

The present invention relates to an apparatus or assembly for mounting a vibrating body to a support structure. More specifically, the invention relates to a system comprising mounting devices adapted to mount a body or mass subject to vibrational excitations to a frame or support structure, with damping or isolation of such vibration. The invention is particularly suitable for use in mounting an internal combustion engine to a motor vehicle frame or body.

In mounting a vibrating body to a support structure, such as in mounting an internal combustion engine to the frame or unibody of a motor vehicle, it long has been known to employ elastomeric block structures as mounting devices to provide damping of the vibrations generated by the body. Difficulty exists, however, in effectively damping or isolating the broad range of vibrational frequencies and amplitudes generated by, for example, an internal combustion engine. One significant difficulty lies in that the damping provided by known elastomeric engine mounts varies proportionately with the transmissability of vibration by such engine mount. That is, while a relatively hard, highly damped elastomer will provide good damping of high amplitude vibrations, it is relatively ineffective to damp low frequency low amplitude vibrations such as vibrations during engine idle. On the other hand, relatively soft elastomeric mounts, while better able to isolate low frequency low amplitude vibrations, would be relatively ineffective to damp high amplitude vibrations.

An effective engine mounting device or system is needed, therefore, to damp or isolate a broad range of vibrational modes and a broad range of vibration frequencies and amplitudes. Thus, for example, an internal combustion engine will produce relatively low frequency, low amplitude torque pulses during engine idle. Larger amplitude torques are generated during clutch release and rapid acceleration. In addition, substantially vertical vibrational modes include low amplitude, high frequency vibrations such as those generated by powertrain deformations and second order unbalanced inertia forces typical in four cylinder engines. Also, large amplitude essentially vertical vibrations must be damped, such as those generated by large amplitude powertrain deflections and even externally caused vibrations such as those generated by vehicle tire collisions with road obstructions, potholes etc. It is an object of the present invention to provide a mounting system which provides damping or isolation substantially effective for a broad range of vibrational frequencies, amplitudes and modes.

Known motor vehicle engine mounting systems and devices have proven unsatisfactory and, in particular, have not been sufficiently effective in damping or isolating all of the different vibrational modes generated in normal use of a motor vehicle. In U.S. Pat. No. 4,159,091 to LeSalver et al. is disclosed a damping device for suspension of a motor vehicle engine. The device is relatively complex, having two internal chambers, the first of which and at least a portion of the second of which chambers is filled with liquid, a partition wall with a calibrated orifice dividing the two chambers. A somewhat similar approach is suggested in U.S. Pat. No. 4,352,487 to Shtarkman, wherein a shock absorber is shown to have inner and outer rigid members connected by an elastomeric shear spring and having a main fluid chamber disposed between the two rigid members in fluid communication through a restricted orifice to a second fluid chamber within the inner rigid member. A third chamber is provided, specifically an elastomeric bladder within the second fluid chamber, which is selectively chargeable with gas pressure for calibrating the damping characteristics of the device. In addition, a fourth chamber is provided, specifically an elastomeric diaphram, which is included in the main fluid chamber to provide a selectively chargeable gas chamber. Another elastomeric engine mount with hydraulic damping is shown in U.S. Pat. No. 4,161,304 to Brenner et al. The engine mount thereof includes an elastic peripheral wall joined with metallic end walls to form a liquid-filled main chamber and a liquid-filled auxiliary chamber. The two metallic end walls are rigidly connected. The peripheral walls function as thrust springs. The partition between the two liquid-filled chambers is said to be either rigid and stationery or moveable. An engine mount of this kind is said to be suitable to strongly damp lower frequency, high amplitude oscillations of the engine while allowing high frequency oscillations with low amplitude pass undamped. Early attempts were made to provide improved damping by interconnecting multiple engine mounts. Thus, for example, in U.S. Pat. No. 2,038,968 to Summers an engine mount is shown in which an elastomeric peripheral wall together with rigid end walls defines a fluid-filled chamber. A helical spring is embedded in the elastomeric wall for reinforcement and damping effect, while an additional damping mode is said to be provided by virtue of a conduit providing fluid communication between the fluid-filled chamber of one and another such engine mount. A similar mounting system is suggested in U.S. Pat. No. 2,705,118 to Beck, wherein rigid supporting and supported members are interconnected by a body of resilient elastomer. The elastomeric body, together with the supporting member defines a fluid-filled chamber which is so designed as to expand or contract as the supported and supporting members vibrate toward and away from each other. The chambers are said to be filled with hydraulic brake fluid and it is suggested that damping of torsional vibration can be achieved by a fluid flow restrictor valve interposed in the connecting line between the liquid-filled chambers. U.S. Pat. No. 1,655,204 to Stevens is directed to a vehicle suspension means employing a fluid communication line between mounting devices.

SUMMARY OF THE INVENTION

According to the present invention an assembly for mounting a vibrating body to a supporting structure, such as an internal combustion engine to a motor vehicle frame, comprises a plurality of mounts and is adapted to damp or isolate vibrations transmitted to or originating in such vibrating body. The assembly comprises a plurality of mounts, each of at least two of which mounts comprises:

(A) a substantially rigid housing with a first opening through the housing and a second opening remote from the first, the housing being adapted to be rigidly attached to either the vibrating body or the support structure;

(B) a first deformable elastomeric body sealingly bonded to the housing to form a fluid-tight closure of the first opening of the housing;

(C) a second deformable elastomeric body of higher hysteretic damping value then the first elastomeric body, being sealingly bonded to the housing to form a fluid-tight closure of the second opening of the housing, wherein the housing, first elastomeric body and second elastomeric body together enclose an expandable chamber adapted to receive fluid;

(D) means for attaching the mount to whichever of the vibrating body and support structure the housing is not rigidly attached, such attaching means being fixedly coupled to the first elastomeric body; and (E) means for communicating fluid between the chamber of one such mount and that of at least one other such mount.

According to preferred embodiments of the invention, the fluid contained within the interconnected fluid chambers of the mounts comprises a gas phase and a liquid phase and the chambers are sufficiently filled with fluid and the mounts so oriented that vibration of the engine or other mounted body in normal operation causes liquid rather than gas to flow through the fluid communicating conduit. Also, where the vibrating body being mounted is subjected to relatively large amplitude torsional forces and displacements, preferably two mounts as described above are disposed in a plane substantially normal to the roll axis of the body, that is, to the axis about which the suspended body is torsionally displaced. In this way, the tortional displacement of the suspended body will create pressure against the first elastomeric body of one such mount, thereby reducing the size of the fluid-filled chamber within such first mount. At the same time that the first elastomeric body of such first mount at one side of the torque axis is being forced into compression, the first elastomeric body of the mount at the opposite side of the torque axis is put in tension, such that the fluid-filled chamber of such second mount is expanded in volume. Thus, in response to a large amplitude torsional displacement of the suspended body, the respective fluid-filled chambers of two mounts disposed on opposite sides of the torque axis (preferably both lying in a plane normal to such axis) have opposite volume changes, with the result that liquid is forced to flow through the aforesaid connecting conduit. By means of a restricting orifice inserted in the fluid conduit or, preferably, by means of a reduced diameter conduit, the conduit cannot immediately accommodate the fluid flow, thereby causing deflection of the second elastomeric element (the more highly damped elastomeric body) of the first mount, whereby the tortional displacement is effectively damped. Also, it will be apparent that there is damping provided also by the restricted flow of fluid through the conduit.

Additional features and advantages of the present invention will be apparent from the following description of the preferred embodiment of the invention and the illustrations thereof.

BRIEF DESCRIPTION OF THE DRAWINGS

The invention will now be described with reference to the accompanying drawings in which.

DESCRIPTION OF THE PREFERRED EMBODIMENT

Figure 1:
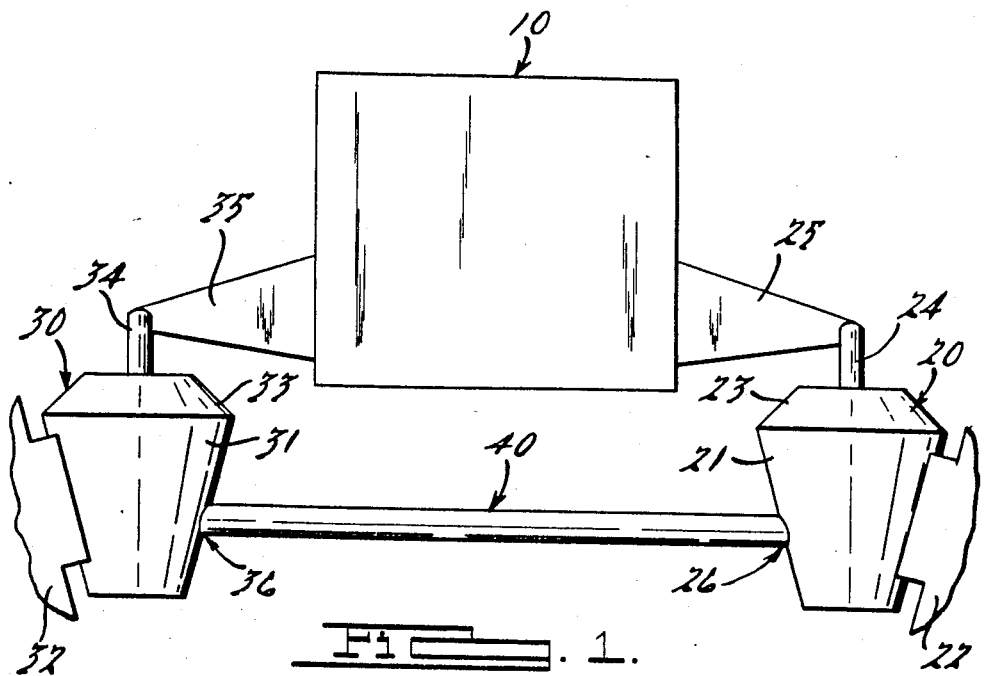
FIG. 1 is a diagramatic front elevation of an assembly according to the invention in assembly with a mounted body.
Figure 2:
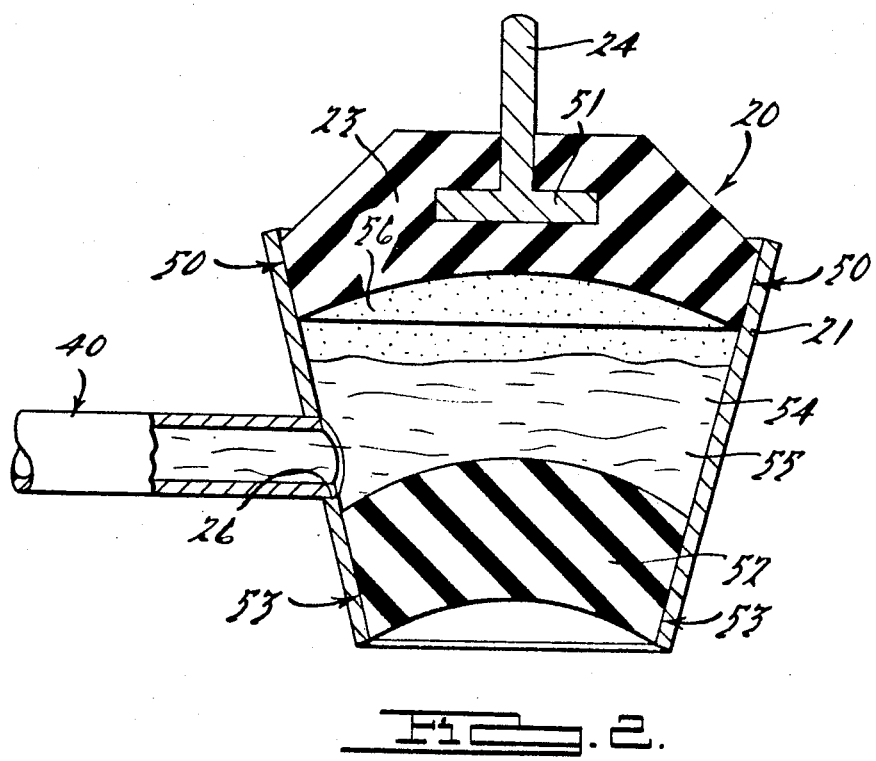
FIG. 2 is a view in cross-section of a fluid-filled mount according to the invention.

The assembly for mounting a vibrating body according to the present invention is especially suitable for use as an engine mounting system for a motor vehicle and for convenience the following discussion will describe the invention employed in such context. Referring now to the drawings, wherein the same number is used for a given feature in each of the drawings in which it appears, FIGS. 1 and 2 illustrate an engine mounting system comprising an engine 10 supported by a pair of engine mounts 20 and 30. Engine mounts 20 and 30 each comprises a rigid housing 21,31, respectively, forming a frustro-conical sleeve opened at the upper, larger diameter end and also at the lower, smaller diameter end. The housings are rigidly attached to a support member 22,32 comprising an element of a vehicle frame or body. Each of the engine mounts further comprises a deformable elastomeric body 23,33 sealingly bonded to the inner surface of the housing at the larger diameter end thereof to form a fluid-tight closure of that end of the housing. Rigid attachment means 24,34 are fixedly coupled to the elastomeric body 23,33, respectively, and are adapted to fixedly engage a member 25,35 which is rigidly integral with the engine. Typically, such attachment means comprises a hardened metal post which is molded into the elastomeric body with a flange or washer connected to the post and embedded in the elastomeric body. The housing of the engine mounts each provides a port 26,36. Conduit 40 is sealingly attached to each of the engine mounts at such ports and is adapted to carry the flow of fluid between one engine mount and the other.

Referring particularly to FIG. 2, engine mount 20 of FIG. 1 is illustrated in cross-section. Deformable elastomeric body 23 is seen to be sealingly bonded at surface 50 to the frustro-conical housing 21 at the upper, larger diameter open end thereof. Rigid attachment means 24 is seen to comprise a metal post with an anchoring flange 51 embedded in the elastomeric body 23. Preferably, the attachment post is molded into the elastomer so as to be bonded thereto. A second elastomeric body 52 is seen to form a fluid-tight closure of the lower, smaller diameter opening of the housing. That is, the second elastomeric body 52 is continously sealed to the housing at surface 53. Conduit 40 is attached to the housing at port 26. It can be seen that the two elastomeric bodies and the rigid housing cooperate to define a chamber 54, which chamber is expandable and contractable upon deformation of the two elastomeric bodies. Thus, for example, in response to hydraulic pressure through conduit 40 the chamber 51 can expand. Also, in response to movement of the engine relative to the support structure of the motor vehicle, the upper elastomeric body 23 will be put into compression or tension with corresponding deformation and corresponding decrease or increase, respectively, in the volume of the chamber 54. As seen in FIG. 2 the fluid-filled chamber 54 preferably comprises both liquid 55 and gas 56 and the port 26 is positioned to remain below the level of liquid within the engine mount during normal operation.

Figure 3:
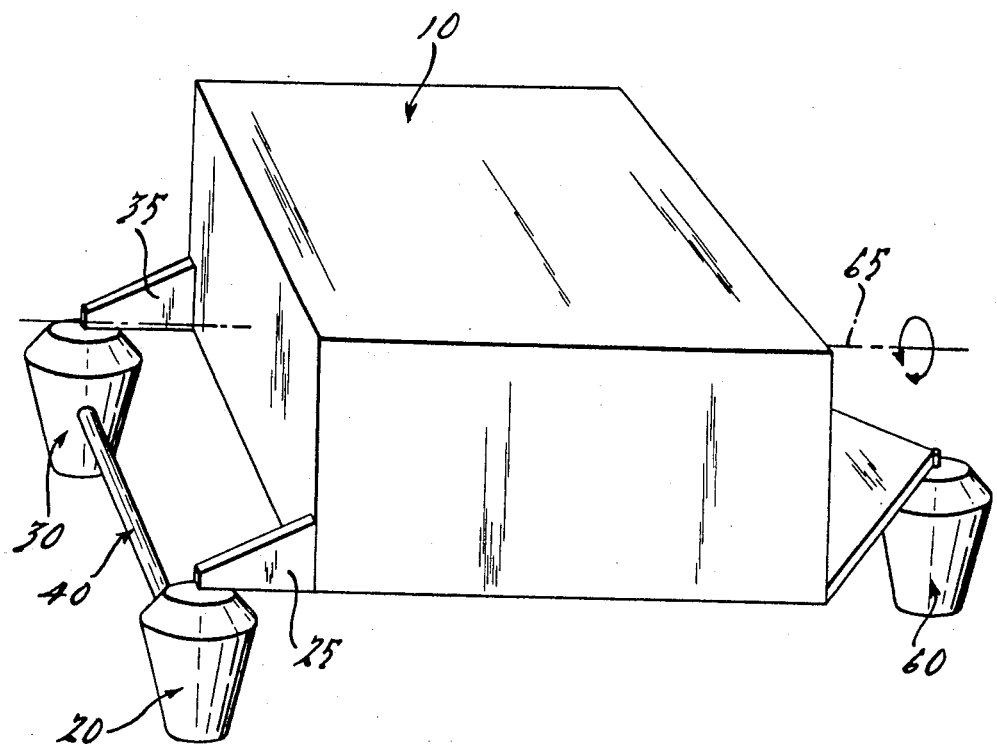
FIG. 3 is a perspective view of an assembly according to the invention shown with a mounted body.

A preferred embodiment of the invention is illustrated schematically in FIG. 3, wherein engine 10 is mounted by three engine mounts 20, 30, 60 to a motor vehicle support structure (not shown). The engine has a primary roll axis 65 and it can be seen that engine mounts 20 and 30 are positioned in a plane substantially orthogonal to the roll axis. Thus, upon torsional displacement of engine 10 about roll axis 65, one of the engine mounts 20 and 30 will be put in compression and the other will be put in tension. Assuming a sufficiently large and rapid movement of the mounted body, the higher damped elastomeric body of that one of the engine mounts which is put in compression, that is the elastomeric body sealing the lower, smaller diameter end of the housing, will be displaced by the increase in pressure within the fluid-filled chamber thereby damping the torsional displacement of the engine. Thus, it is a characterizing aspect of the mounting assembly of the invention that the conduit providing fluid communication between mounts is sized to permit a flow of fluid therethrough at a maximum rate in response to a large amplitude torsional displacement of the suspended body, which rate is insufficient to prevent the build-up of pressure within the fluid chamber sufficient to substantially deform the higher damped elastomeric body. Deformation of the higher damped elastomeric body provides effective damping of such large amplitude torsional displacements. Proper sizing of the conduit to provide such pressure build-up wihtin the mount is a function of both tube length and diameter and of fluid rheology. It will be within the ability of those skilled in the art in view of the present disclosure to select suitable conduit dimensions and fluid properties to provide such fluid build-up. It also will be within the skill of the art to employ flow restrictions such as reduced diameter orifices within the conduit to provide such pressure build-up. Also, the displacement of fluid through conduit 40 from the engine mount in compression to the engine mount in tension will further damp the torsional displacement. Optionally, the third engine mount can be constructed as shown in FIG. 2 and the fluid-filled chamber thereof can be in fluid communication with the other two engine mounts. In that case, the mounting assembly functions also to damp fore/aft rocking displacement of the engine according to the same method discussed above regarding damping of large amplitude torsional displacements. Preferably, the weight of the engine is supported by the elastomeric material in compression rather than in tension.

Suitable materials for the various components of the mounting system of the invention will be apparent to the skilled of the art in view of the foregoing disclosure. Generally, the selection of suitable materials will depend in large part upon the intended use of the mounting system. For use in mounting an internal combustion engine in a motor vehicle, the lower damped elastomer, that is the elastomeric body forming the closure of the larger diameter opening of the housing, in which is embedded the attachment post, preferably comprises a material such as rubber or a synthetic elastomeric material having hysteretic damping value of about 6–16% of rate, where rate is defined as the pounds force per inch of elastomeric deformation of the material. In a typical motor vehicle application, each engine mount might bear, for example, about 150 lbs., more typically about 400–500 lbs., of engine weight and have a rate of from about 200 lbs. per inch to about 1,500 lbs per inch deformation, depending upon the vehicle noise, vibration and ride harshness characteristics desired. It will be understood by those skilled in the art that the rate is determined not only by the durometer of the elastomeric material, but also by its physical shape, location of attachment, and the direction of forces applied.

The second elastomeric body, that is, the one to which the engine attachment means is not directly attached, is of higher damped elastomeric material such as, for example, for use in motor vehicle engine mounts, styrenebutyl rubber or other synthetic elastomeric material having a hysteretic damping value of about 7–19% of rate. The fluid conduit interconnecting the engine mounts can be any of a wide variety of materials readily apparent to the skilled of the art, of which many are readily commercially available. Again, the choice of materials and dimensions will depend largely upon the application in which the mounting system is to be used. Typical for use in a motor vehicle in an engine support application would be an inside tube diamter of about $\frac{1}{4}$ inch to about 1 inch. Of course, as noted above, some or all of the damping provided by flow of fluid through the conduit can be provided by a restricted orifice inserted in the conduit. The tube must be of sufficient length to extend between the mounts and in a motor vehicle engine mount assembly, for example, about 20–40 inches would be typical. The conduit can be constructed of the same materials presently used in motor vehicles for hydraulic fluid lines, for example brake lines and the like. Preferably the tube does not significantly expand under pressure, such that high amplitude tortional displacements of a body suspended as shown in FIG. 3 would cause sufficient pressure increase within the fluid-filled chamber to deform the higher damped elastomeric body, whereby such torsional displacement would be effectively damped, as discussed above. Numerous suitable materials are available for the housing of the mounting device. Thus, for example, sheet steel, filament reinforced synthetic resins, for example graphite reinforced epoxy and the like, and aluminum alloys are commercially available and well known to the skilled of the art. The liquid phase of the fluid filling the mount chambers and the interconnecting conduit should be inert and compatible with the materials of the mount. Numerous suitable liquids are commerically available and will be apparent to the skilled of the art in view of this disclosure. Thus, for example, for use in a motor vehicle application ethylene gylcol would be suitable. Typically, the liquid would have the viscosity of about 100–200 lbs.(mass)/ft. sec. $\times 10^4$.

In view of the foregoing disclosure, the operation of preferred embodiments of the invention will be apparent to those skilled in the art. Thus, assuming again use of the invention as an engine mounting system in a motor vehicle, the gas phase of the fluid filling the internal chamber is found to be highly effective at isolating very high frequency low amplitude vibration. According to preferred embodiments discussed above, the gas phase is intermediate the liquid phase and the lower damped elastomeric body to which the engine is attached through attachment means 24. The gas phase provides a non-linear spring effect with very low transmissability of high frequency low amplitude vibration. This is especially effective to isolate the passenger compartment of a motor vehicle from such vibrations as engine shake at driving speeds, for example the second order inertia forces typically generated by four cylinder engines. Lower frequency very large amplitude vibrations in a verticle direction are effectively damped by deformation of the higher damped elastomeric body. Thus, upon vehicle impact with a road obstruction, pothole etc. each of the engine mounts would receive substantially simultaneously a verticle (i.e. compressive) force input. The size of the chamber within each of the engine mounts would simultaneously be decreased and damping would be provided by elastic deformation of the lower damped elastomeric body and, more significantly, by elastic deformation of the higher damped elastomeric body. Preferably, static support for the engine is provided essentially by the lower damped elastomeric body to (preferably in compression) which the engine is directly attached, together with the rigid housing to which to support member is directly attached. The lower damped elastomeric body provides essentially linear spring affect and, thus, is effective to isolate and damp high frequency low amptiude vibrations. As already discussed, lower frequency, high amplitude torsional displacements of the engine, such as those generated during sudden clutch release and rapid vehicle acceleration, are effectively damped by elastic deformation of the higher damped elastomeric body in response to generation of pressure within the chamber and transmission of each pressure to the higher damped elastomeric body by the liquid phase. Such torsional displacement of the engine, also referred to as powertrain windup, places one engine mount into compression and places a second engine mount (which with the first engine mount lies in a plane substantially orthogonal to the whole axis of the engine) in tension. Thus, the chamber of the first engine mount is reduced in size while that of the second is expanded. The fluid conduit is selected to have a diameter insufficent to simultaneously accommodate a flow of fluid from the first chamber to the second, whereby forces transmitted to the higher damped elastomeric body and the deformation thereof results in damping of the torsional engine displacement.

INDUSTRIAL APPLICABILITY

From the foregoing disclosure it will be apparent that the present invention has applicability as an engine support system for motor vehicles and also as a support system for like applications wherein a body subject to vibrational and other displacements must be supported and the vibrations thereof damped and isolated from the supporting structure.

I claim:

1. An assembly for mounting a vibrating body to a support structure, being adapted to damp vibrations transmitted form said body to said structure, said assembly comprising a plurality of mounts, each of at least two of said mounts comprising:
   (A) a substantially rigid housing with a first opening through said housing and a second opening therethrough remote from said first opening, said housing being adapted to be rigidly attached to one of said body and said support structure;
   (B) a first deformable elastomeric body sealingly bonded to said housing to form a fluid-tight closure of said first opening of said housing;
   (C) a second deformable elastomeric body of higher hysteretic damping value than said first elastomeric body, said second elastomeric body, being sealingly bonded to said housing to form a fluid-tight closure of said second opening of said housing, wherein said housing, said first elastomeric body and said second elastomeric body together enclose an elasticly expandable chamber adapted to receive fluid;
   (D) means for attaching said mount to the one of said body and said support structure to which said housing is not rigidly attached, said attaching means being fixedly coupled to said first elastomeric body; and
   (E) means for communicating said fluid between the chamber of one said mount and that of at least one other said mount 2. The mounting assembly of claim 1, wherein said fluid communicating means and the chamber of each of said at least two mounts contain fluid, said fluid comprising both a gas phase and a liquid phase.

3. The mounting assembly of claim 1, wherein said first elastomeric body has a hysteretic damping value of about 6%–16% of rate, where rate is the ratio of applied force to amount of elastic deformation of the body.

4. The mounting assembly of claim 1, wherein said second elastomeric body has a hysteretic damping value of about 7%–19% of rate, where rate is the ratio of applied force to amount of elastic deformation of the body.

5. The mounting assembly of claim 1, wherein said fluid communicating means comprises a substantially rigid tube.

6. The mounting assembly of claim 1, wherein said fluid communicating means comprises a tube and a valve in said tube, the flow of fluid through said tube being controllable by said valve.

7. The mounting assembly of claim 1, wherein said fluid communicating means is substantially filled with liquid and each said chamber is substantially filled with fluid comprising both a liquid phase and a gas phase.

8. An engine mounting system for a motor vehicle, comprising a plurality of engine mounts adapted for mounting the engine to a support structure of the motor vehicle, each of at least two of said engine mounts comprising:
   (A) a substantially a rigid housing forming a sleeve open at a first end and at a second end, said housing being adapted to be rigidly attached to one of said engine and said support structure;
   (B) a first deformable elastomeric body sealingly bonded to said housing, forming a fluid-tight closure of said first open end of said housing;
   (C) means for attaching said engine mount to the one of said engine and said support structure to which said housing is not rigidly attached, said attaching means being fixedly coupled to said first elastomeric body;
   (D) a second deformable elastomeric body of higher hysteretic damping value than said first elastomeric body, said second elastomeric body being sealingly bonded to said housing, forming a fluid-tight closure of said second end of said housing, wherein said housing, said first elastomeric body and said second elastomeric body together enclose an elasticly expandable chamber adapted to receive fluid;
   (E) means for communicating said first fluid between the chamber of one said engine mount and that of at least one other said engine mount, said fluid communicating means and said chambers together forming a fluid-tight enclosure.

9. The engine mounting system of claim 8, wherein said fluid communicating means and the chamber of each of said at least two mounts contain fluid, said fluid comprising both a gas phase and a liquid phase 10. The mounting assembly of claim 8, wherein said first elastomeric body has a hysteretic damping value of about 6%–16% of rate, where rate is the ratio of applied force to amount of elastic deformation.

11. The engine mounting system of claim 8, wherein said second elastomeric body has a hysteretic damping value of about 7%-19% of rate, where rate is the ratio of applied force to amount of elastic deformation.

12. The engine mounting system of claim 8, wherein said fluid communicating means comprises a substantially rigid tube.

13. The engine mounting system of claim 8, wherein said fluid communicating means comprises a tube and a valve in said tube, the flow of fluid through said tube being controllable by said valve.

14. The engine mounting system of claim 8, wherein said fluid communicating means is substantially filled with liquid and each said chamber is substantially filled with fluid comprising both a liquid phase and a gas phase.

15. An engine mounting system mounting an internal combustion engine to a support structure of a motor vehicle, said engine having a primary torsional displacement axis, said engine mounting system comprising a plurality of engine mounts, each of at least two of said engine mounts comprising:
   (A) a substantially rigid housing forming a frustro-conical sleeve open at a first, larger diameter end and open at a second, smaller diameter end, said housing having an inside surface and an outside surface and having a fluid flow port therethrough, said housing being rigidly attached to said support structure;
   (B) a first deformable elastomeric body sealingly bonded to the inside surface of said housing at said first open end of said housing, forming a fluid-tight closure of said first open end;
   (C) rigid attachment means fixedly coupled to said first elastomeric body and rigidly engaging an engine member which is rigidly integral with said engine;
   (D) a second deformable elastomeric body sealingly bonded to the inside surface of said housing at said second opening end of said housing, forming a fluid-tight closure of said second open end, said second elastomeric body being of higher hysteretic damping value than said first elastomeric body, wherein, in each of said at least two engine mounts, said housing, said first elastomeric body and said second elastomeric body together define an elasticly expandable chamber; and
   (E) a conduit sealingly attached at one end to the fluid flow port of one said engine mount and sealingly attached at another end to the fluid flow port of at least one other said engine mount, said conduit and said fluid flow ports permitting flow of fluid between the chamber of said one engine mount and said other engine mount, which two chambers together with said conduit form a continuous, fluid-tight enclosure, said one engine mount and said other engine mount being oriented in a plane substantially orthogonal to said primary torsional displacement axis of said engine.

16. The engine mounting system of claim 15, wherein said at least two engine mounts comprises a third engine mount oriented in a vertical plane including said primary torsional displacement axis of said engine.

17. The engine mounting system of claim 16, wherein the fluid flow port of said third engine mount is sealingly attached to a third end of said conduit.

* * * * *